Feb. 5, 1929.

A. E. FOWLE 1,701,151

METHOD AND APPARATUS FOR HEATING MOLTEN GLASS

Filed March 27, 1926

INVENTOR.
Arthur E. Fowle.
Frank Fraser,
ATTORNEY.

Patented Feb. 5, 1929.

1,701,151

UNITED STATES PATENT OFFICE.

ARTHUR E. FOWLE, OF BERKELEY, CALIFORNIA, ASSIGNOR TO THE LIBBEY-OWENS SHEET GLASS COMPANY, OF TOLEDO, OHIO, A CORPORATION OF OHIO.

METHOD AND APPARATUS FOR HEATING MOLTEN GLASS.

Application filed March 27, 1926. Serial No. 97,918.

The present invention relates to an improved process and apparatus for supporting a receptacle or drawpot which may be supplied with molten glass, and more particularly to a heating means therefor.

An object of the invention is to provide means whereby the temperature of the molten glass contained in a draw-pot can be accurately controlled by either gas or electricity, or both.

A further object of the present invention is to maintain a contained mass of molten glass supported in a heated chamber, in a more uniformly heated state than heretofore.

Another object of the invention is to provide a heating chamber with a plurality of various sources from which heat may be obtained.

Still another object of the present invention is to create a clean heat in a heating chamber supporting a pot containing molten glass, and allowing only this clean heat to heat treat the upper surface of the molten glass in the draw-pot.

Other objects and advantages of the invention will become apparent during the course of the following description.

Figure 1:
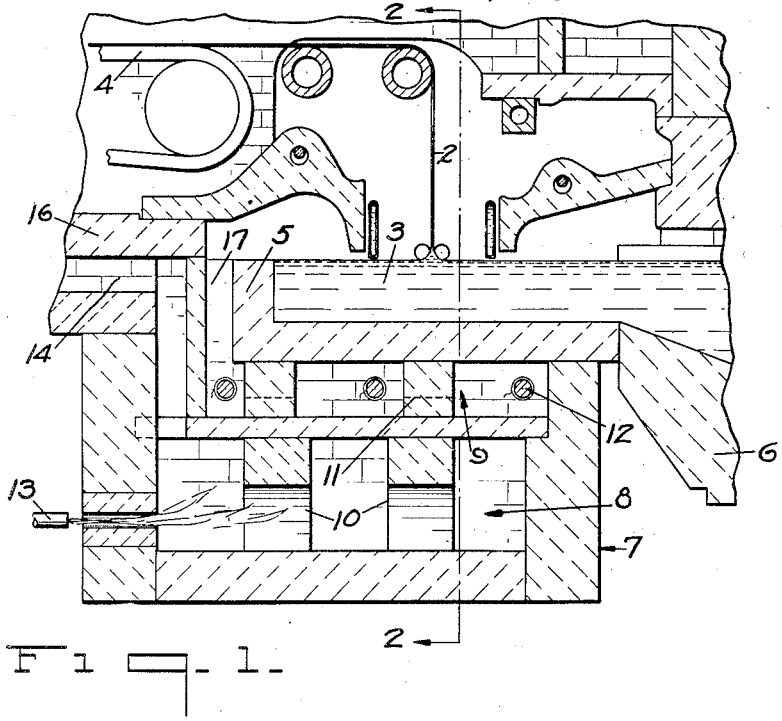
Figure 2:
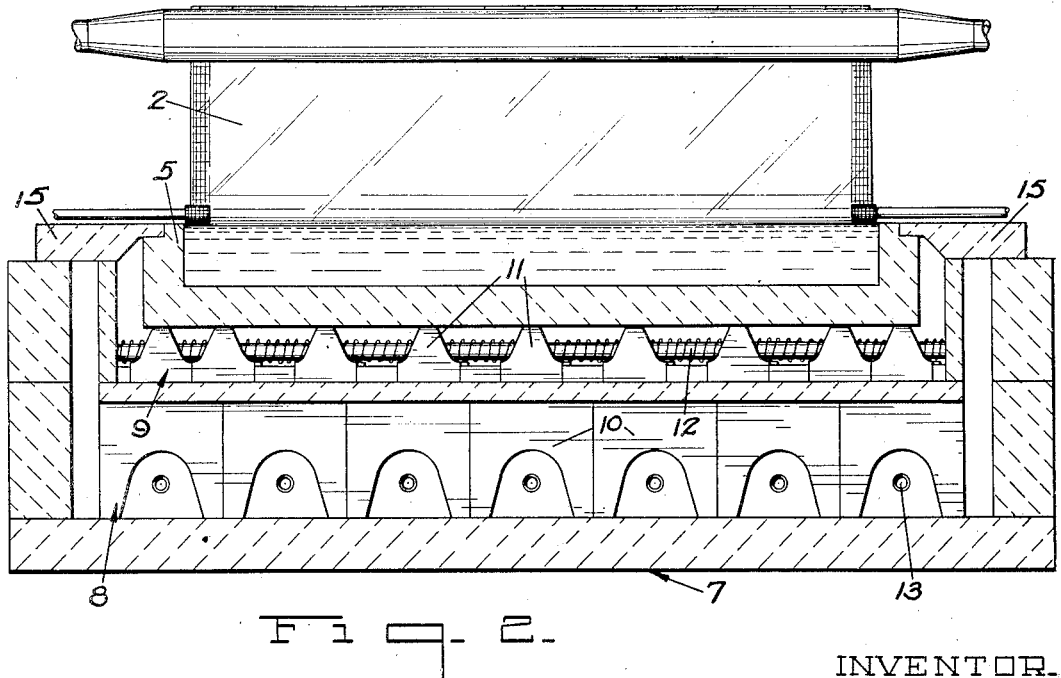

In the drawings wherein like numerals are employed to designate like parts throughout the same, Fig. 1 is a longitudinal sectional elevation through the improved construction, and Fig. 2 is a transverse sectional elevation on line 2—2 in Fig. 1.

In the drawings the numeral 2 refers to a glass sheet continuously drawn from a mass of molten glass 3 by a drawing mechanism 4. The molten glass 3 from which the sheet is drawn is supplied to the pot 5 from a melting tank 6.

With the improved form of construction the pot 5 is surrounded from beneath by a heating chamber 7, preferably consisting of two compartments 8 and 9. The lower compartment 8 has arranged therein stools 10 for supporting the upper compartment 9. The pot 5 is supported within the upper compartment 9 on stools 11. The compartment 9 is heated electrically by means of the electric heating elements 12 disposed therein. These elements or resistors may be connected in series or parallel, and may be controlled in the usual manner by necessary switches and rheostats. The compartment 8 is heated with gas which is supplied thereto through the burners 13. The products of combustion forming in this gas heated compartment are carried therefrom through the passage 14. The heat created in the respective compartments is transmitted to the other mostly by conduction, the direct transmission of the heat from the gas heated compartment being muffled from the electrically heated compartment, and vice-versa by the walls of the upper compartment 9 and the cover tiles 15 and 16. A part of the heat surrounding the draw-pot passes therefrom, preferably through the passage 17 provided by the end wall of the compartment 9 and the end of the draw-pot.

As set forth in the Colburn Patent, 1,248,809, granted December 4, 1917, a drawpot containing a mass of molten glass is supported within a heated chamber, the temperature of the glass being controlled by the manipulation of gas burners in communication with the heated chamber. The present invention is particularly well adapted for use in connection with the Colburn process of drawing glass from a pot, but is not necessarily limited thereto.

It is quite necessary and important that the molten glass, from which a sheet is continuously drawn, be heated as evenly as possible, and thus maintain it at a constant uniform temperature.

It is a well known fact that electricity produces a more uniform and constant heat than any of the other forms of heating. As far as is known, it has been impossible to satisfactorily produce sufficient heat electrically which will have a temperature great enough to suitably condition a mass of molten glass, so that it may be drawn away in sheet form, particularly in connection with the Colburn process of drawing glass.

The purpose of this invention is to combine muffled gas heat with electric heat in such a manner that the combination will efficiently maintain the molten glass in a uniformly heated state. The preferred form of apparatus for accomplishing this purpose is clearly shown in Fig. 1.

In the present invention the molten glass in the draw-pot is primarily heated by electric heat created in compartment 9 to the highest temperature possible, using suitable electric heating apparatus of the present day capacity. The heat in this compartment is then boosted by a gaseous heat, having a higher temperature, created within the supplemental compartment 8 (surrounding the first mentioned compartment). It is desirable that the electrically heated compartment should immediately surround the draw-pot for reasons other than the uniformity of heating resulting therefrom, as stated above, one of which is the fact that the heat in this compartment is clean, that is, it is free from dirt, soot and oxidizing or reducing agents, etc., ordinarily present in the heat from other forms of heating chamber constructions. Therefore, this clean heat can be used with much better satisfaction for heat treating the surface of the molten glass at the far end of the draw-pot than heretofore.

It is believed that the heat leaving the gas heated compartment by conduction will have little effect upon the uniformity of the heat created in the electrically heated compartment.

The required drawing temperature of the glass in the draw-pot is then brought about and controlled by the proper manipulation of valves, switches and rheostats connected to the respective compartments in the heating chamber.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass drawing apparatus, a draw-pot containing molten glass from which a sheet is drawn, a heating chamber surrounding and supporting the draw-pot, and means for heating the chamber by electricity and gas.

2. In sheet glass drawing apparatus, a draw-pot, a heating chamber surrounding and supporting the draw-pot, and a plurality of heated compartments in the chamber arranged one above the other.

3. In sheet glass drawing apparatus, a draw-pot a heating chamber surrounding and supporting the draw-pot, and a plurality of separately heated compartments in the chamber arranged one above the other.

4. In sheet glass drawing apparatus, a draw-pot, a heating chamber surrounding and supporting the draw-pot, means for heating the chamber electrically and with a gaseous fuel, and means for keeping the gases separated from the electric heat.

5. In sheet glass drawing apparatus, a draw-pot containing a mass of molten glass, a heating chamber surrounding and supporting the draw-pot, a compartment in the chamber heated by a gaseous fuel, a second compartment in the chamber heated by electricity, and means for carrying off the burnt gases from the gas heated compartment.

6. In sheet glass drawing apparatus, a draw-pot containing a mass of molten glass, a chamber heated electrically surrounding the pot, and an auxiliary chamber heated with gas surrounding the first mentioned chamber.

7. In sheet glass drawing apparatus, a draw-pot containing a mass of molten glass, a heating chamber surrounding the draw-pot, and a plurality of heated compartments in said chamber arranged one above the other, heat being transmitted from one compartment to the other by conduction.

8. In sheet glass drawing apparatus, a draw-pot containing a mass of molten glass, means arranged beneath said draw-pot for heating the glass electrically and with a gaseous fuel, and means for keeping the gases separated from the electric heat.

9. In sheet glass drawing apparatus, a draw-pot, a heating compartment supporting the pot, means within the compartment for heating same, a second compartment surrounding the first compartment, and means for heating the second compartment.

10. In sheet glass drawing apparatus, a draw-pot containing a mass of molten glass, a heating compartment surrounding the pot, electric resistors through which a current is passed disposed within said compartment for heating the glass, a supplemental compartment heated by a gaseous fuel surrounding and supporting the first mentioned compartment for boosting the temperature of the first mentioned compartment.

11. In sheet glass drawing apparatus, a draw-pot containing a mass of molten glass, a primary heating means arranged beneath said draw-pot for heating the glass, and a secondary heating means also arranged beneath the draw-pot and positioned beneath the primary heating means for boosting the temperature of the heat created by the primary heating means.

12. In sheet glass drawing apparatus, a draw-pot containing a mass of molten glass, a compartment supporting and surrounding the pot, a second compartment supporting and surrounding the first compartment, and means for independently heating the individual compartments.

13. In sheet glass drawing apparatus, a draw-pot, a heating chamber supporting said draw-pot, a plurality of compartments within said chamber, and means for heating the compartments by different forms of heating methods.

14. In sheet glass drawing apparatus, a draw-pot containing a mass of molten glass, means beneath the draw-pot for heating the glass electrically, and means also beneath said draw-pot for heating the glass with a gaseous fuel to boost the temperature of the electric heat.

15. The process of heating a mass of molten glass to a desired temperature and uniformly maintaining it at such temperature, which consists in containing and suitably supporting the glass, and in then heating the glass from beneath by using various forms of heating methods.

16. The process of heating a mass of molten glass to a desired temperature and uniformly maintaining it at such temperature, which consists in containing and suitably supporting the glass, heating the glass from beneath electrically and by a gaseous fuel, and in keeping the gases separated from the electric heat.

17. The process of heating a mass of molten glass to a desired temperature and uniformly maintaining it at such temperature, which consists in containing and suitably supporting the glass above a heating chamber, heating the chamber first with heat from one source of heat generation, and in then boosting the temperature in said chamber with heat from a different source of heat generation.

Signed at Oakland, in the county of Alameda, and State of California, this 19th day of March, 1926.

ARTHUR E. FOWLE.